Oct. 12, 1943.  W. D. BUCKINGHAM  2,331,824
PROCESS FOR COATING PIPE
Filed Oct. 31, 1939
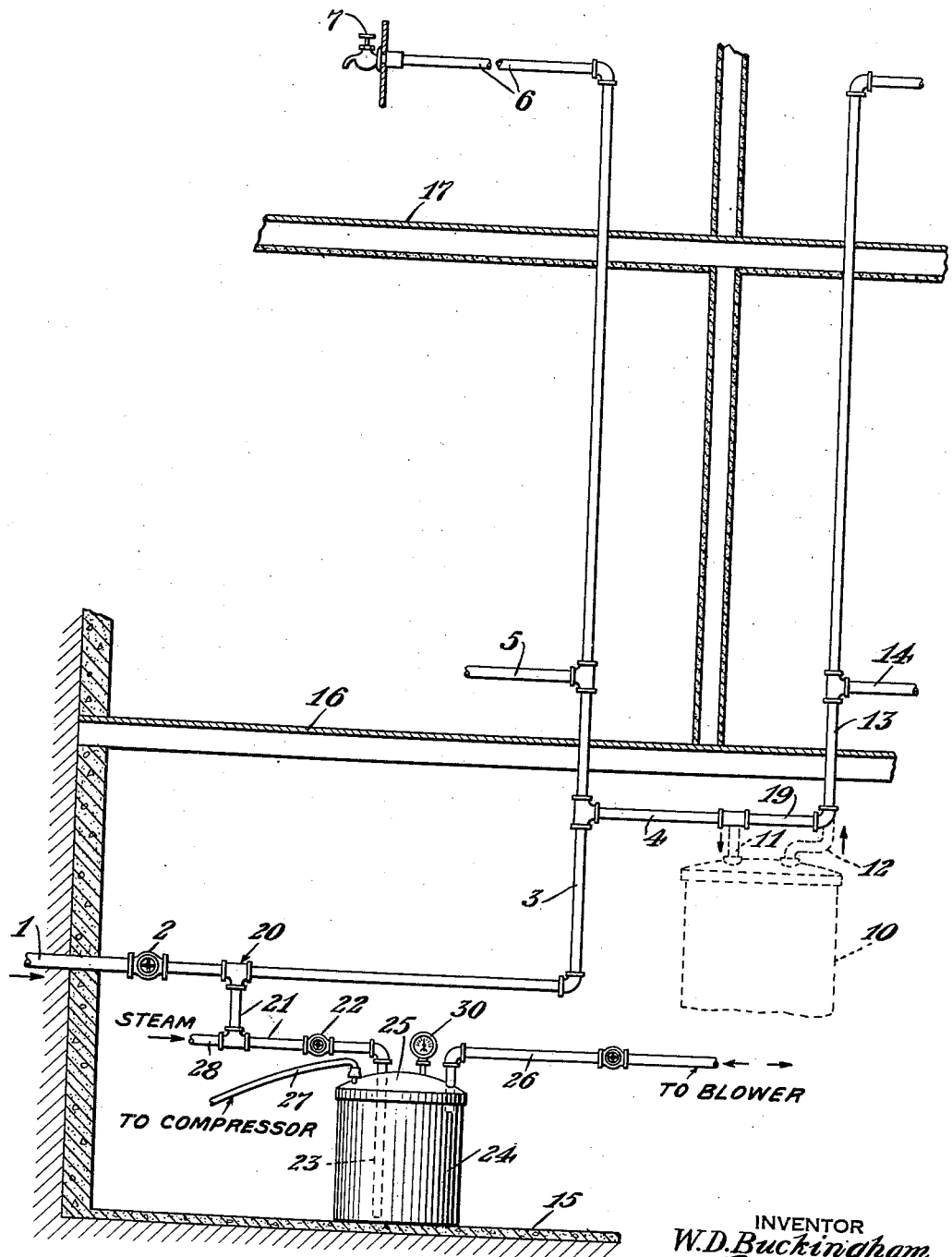
INVENTOR
W. D. Buckingham
BY E. R. Evan
ATTORNEY Patented Oct. 12, 1943

2,331,824

UNITED STATES PATENT OFFICE 2,331,824

PROCESS FOR COATING PIPE

William D. Buckingham, Southampton, N. Y.

Application October 31, 1939, Serial No. 302,110

1 Claim. (Cl. 117—97)

This invention relates to coated pipe and to a process for coating pipe, including the repair of leaky or eroded piping.

In many localities, the fresh water supplied to homes contains a small amount of carbonic acid or dissolved carbon dioxide which over a period of time has an extremely corrosive effect on some piping materials, particularly brass. Apparently a soluble zinc carbonate is formed, eating away the zinc in the pipe and leaving spongy copper. It is often found that brass piping installed for water distribution systems in a comparatively short time becomes weak and porous, and must be replaced. The erosion extends through the entire wall of the pipe, and leakage occurs at the joints and at numerous places along the length of the pipe. Since the piping is located largely in the walls of dwellings and sometimes cast in concrete or other permanent structures, the necessary replacement is a difficult and expensive matter.

An object of the invention is to overcome this difficulty by lining and sealing piping before it is placed in service or even after it has become eroded, to provide a durable protective coating by a simple process and with a material which will not affect the taste or odor of the water where it is used for cooking or drinking purposes.

Another object of the invention is to render brass pipe serviceable for water supply systems in those localities where it has heretofore been found unsatisfactory.

Other objects and advantages of the invention will become apparent from the following description of a preferred embodiment thereof, the single figure of the accompanying drawing illustrating apparatus for carrying out the improved process.

In accordance with the invention, as applied to old brass piping in which corrosion has commenced, the preferred process involves the draining of the entire water supply system of the building and completely filling it with cleaning solutions which will remove all scale, iron rust and organic matter, leaving the porous spongy copper lining of the brass pipe clean. The pipe is then thoroughly dried and thinned "Bakelite" varnish forced in under pressue until it completely fills the piping system and begins to ooze out through the leaks in the system. The liquid is drained out and the coating adhering to the pipe dried, as by blowing air through the system. "Bakelite" varnish of normal consistency is then put into the piping under pressure so as to completely impregnate the spongy copper areas and cover the surfaces normally exposed to the water flowing through the pipe with an adherent coating. After the pipes are again drained, the coating is dried and hardened in situ by polymerization of the "Bakelite."

A thin durable coating is thus formed which is insoluble in water and other fluids, and unaffected by dilute acid or alkaline solutions. The coating is continuous over the inner wall of the pipe and joints, and the spongy portions of the piping are effectively sealed. The results obtained in actual service prove that corrosion in brass piping may be stopped and all leaks sealed for long periods by this process. The process may be applied to new lengths of brass pipe or new piping with or without the steps of cleaning and applying thin varnish, if desired, and may be used with piping of other metal such as iron pipe. It may also be used in connection with other fluid systems where corrosion by carbonic acid or the like is a problem, particularly for handling potable fluids; for example, for lining the tubing of beer coolers. Other coating materials may also be used instead of "Bakelite" varnish, if desired.

Referring to the drawing, the process embodying the invention is particularly applicable to the installed piping of a domestic water supply system, shown in abbreviated fashion, although it is adapted for coating simple lengths of pipe or for the protection of fabricated piping in apparatus and installations of various kinds. The cold water inlet or main 1 is connected through a shut-off valve 2 to piping sections 3, 4, 5 and 6 of varying lengths and location. The piping section 6 is shown as terminating in a faucet 7, for example. The pipe 4 normally supplies the hot-water tank 10 in the basement through the pipe 11, the heated water from the tank normally flowing through the pipe 12 to the hot-water pipes 13, 14. In the drawing, the cellar and upper floors of the house are represented at 15, 16 and 17, respectively.

In preparation for the coating process, the pipes 11 and 12 are disconnected, the hot water tank 10 short-circuited by a pipe 19, and a connection represented by the T 20 is made near the shut-off vlave 2 and at the bottom of the piping system. It may be assumed that the piping shown is brass, and has become eroded by the flow of water containing carbonic acid. The wall of the pipe becomes porous and spongy, and the damage is generally discovered by leakage at joints and at several points along the pipe.

The leaks are sealed and the piping protected against further erosion in the following manner: A pipe 21 from the connection 20 and provided with a shut-off valve 22 has an extension 23 reaching to the bottom of a tank 24 of sufficient capacity to hold the fluid contents of the piping system. The tank 24 is preferably provided with a removable cover 25 to which are attached pipe connections 26 and 27 for a reversible blower and a compressed air supply, respectively. An inlet 28 is provided to admit steam directly to the piping system, when desired. A pressure gauge 30 may also be provided on the tank 24 to indicate the pressure employed during the coating process.

With the shut-off valve 2 closed, all faucets or outlets, such as the faucet 7, and valve 22 are opened and the water in the system drained into the tank 24. The blower may be operated to suck air from the tank and thus facilitate the draining of the system. The water is poured out after noting the volume required to completely fill the piping. A cleaning solution or solutions in sufficient volume to fill the piping are then placed in the tank and forced through the piping by air pressure from the compressor through the hose 27. The piping is completely filled by opening each outlet in turn until the cleaning solution begins to flow therefrom. The solution is preferably left in the piping under, say a pressure of sixty or seventy pounds per square inch for one hour.

Any suitable cleaning solutions may be employed. A first solution of oxalic acid, hydrochloric acid and water, with a small amount of "Igepon," may be followed with a cold water solution containing ammonia and ammonium chloride. These cleaning solutions are sucked from the piping, as described above, and the system then flushed with water from the supply main. The inside of the pipe is then thoroughly dried. This may be done by flushing the piping with alcohol and then blowing air through the system by the blower. The alcohol may be forced through the piping from the tank 24 by compressed air, and mixes with the water remaining in the pipe. After the alcohol is drained, air is blown through the piping for a sufficient time to dry the inside of the pipe. The thorough cleaning and drying of the pipe is an essential part of the process but the detailed procedure described above may be modified by the use of equivalent methods and materials. The use of alcohol or other water-miscible, volatile liquid for drying the pipe, however, is particularly advantageous in re-conditioning water piping where the surface of the pipe contains cracks, seams and rough or spongy portions which are to be filled and covered by an adherent lining material.

After the inside of the piping has been thoroughly cleaned and dried, one or more layers of a durable, water-insoluble protective substance are applied to the surface of the pipe. In accordance with the invention, this substance preferably comprises a solution of a resinous condensation product, such as "Bakelite" varnish sold under the name of "Tuf-On 74 Clear" on the market. This is a typical short-oil varnish of good chemical resistance and is a 12½ gallon oil length straight China-wood cook made with a class one resin in the manner of formula 1657 of the Bakelite Corporation. When this coating material is dried and hardened under moderate heat and pressure, the resin is polymerized to form a durable, adherent, temperature resistant coating on the pipe which is insoluble in water and unaffected by weak acids and alkalis. Other artificial resins may be utilized as the base of the coating if they have similar properties, particularly those which are polymerized by moderate temperatures to a hard, chemically resistant form; i. e., thermo-setting plastic compositions which are resistant to the conditions to which the lining of the piping is subjected. Among the other resinous substances suitable for the purpose may be mentioned other phenolic condensation products, vinyl resins and "Lucite" but, as stated above, "Bakelite" is preferred and appears to be the most suitable coating material. Although no chemical-setting coating materials are disclosed herein, obviously an equivalent substance of this class may also be utilized. It is impossible to list all suitable examples from even the known substances or compounds but the test of equivalency is clearly defined by the above-mentioned properties of the "Bakelite" coating, including durability, temperature resistance, impermeability and adherence to the pipe.

Preferably the piping is first filled from the tank 24 with "Bakelite" varnish thinned by the addition of an equal volume of xylol. The solution is left in the piping under a pressure of, say seventy pounds per square inch, for one hour or until it can be seen oozing from the spongy portions of the pipe from which water formerly leaked. The piping is then drained and air blown through the system from the blower for a considerable period, say two hours. The piping is then filled with a full thickness "Bakelite" varnish, the filling being held under a pressure of, say seventy pounds per square inch, for an hour. An additional coating layer is thus formed which is dried by blowing air through the piping for an hour. The air may be at an elevated temperature but preferably, after an hour, a small amount of dry steam is admitted through the pipe 28 and mixed with the air stream from the blower. The percentage of steam is gradually increased over a two-hour period, after which the air is shut off and steam alone is circulated through the piping for, say three hours, the outlets being opened during the drying and baking periods. If each outlet is only opened a crack during the steam-baking period, the use of steam is economized and the various sections of the piping heated uniformly to polymerize the "Bakelite." Finally cool air is circulated through the piping from the blower for an hour to cool and harden the pipe lining. The connection to the tank 24 is then removed and the normal connections to the hot-water tank 10 replaced.

The lining on the pipe formed by this process seals the pipe and prevents further damage under conditions which cause rapid erosion of bare pipe. New brass pipe may be treated in a similar manner and thereby made serviceable for localities where heretofore it could not be used. The process is applicable to other piping arrangements for warm or cold liquids as well as to brass water piping, and various modifications in the detailed process described may be made, as already indicated, without departing from the scope of the invention as defined in the appended claim.

I claim:

The process of protecting piping against corrosion which comprises the steps of filling the piping with a thinned "Bakelite" varnish, subjecting the filling to a pressure of the order of 70 pounds per square inch, draining said filling and refilling the piping with regular "Bakelite" varnish, subjecting the latter filling to a pressure of the order of 70 pounds per square inch, draining the piping and circulating first air and then steam through the piping for at least an hour to dry and harden the coating adhering to the pipe.

WILLIAM D. BUCKINGHAM.